Patented May 15, 1951

2,553,046

UNITED STATES PATENT OFFICE 2,553,046

CONDENSATION PRODUCTS OF NAPHTHOQUINONE IMINES AND PROCESS OF MAKING SAME

Valentin Kartaschoff, Basel, Switzerland, assignor to Sandoz Limited, Basel, Switzerland, a corporation of Switzerland No Drawing. Application April 22, 1947, Serial No. 743,195. In Switzerland April 26, 1946

18 Claims. (Cl. 260—396)

The present invention relates to the manufacture of new condensation products derived from naphthoquinone imides. According to the present invention new valuable condensation products can be obtained, if halogenated naphthoquinone imides are condensed with ammonia, amines, polyvalent alcohols, phenols or thiophenols.

The halogenated naphthoquinone imides used as starting materials can be obtained for example by the process described in copending application, Ser. No. 729,401, filed February 18, 1947, according to which the said halogenated naphthoquinone imides can be obtained by treating a naphthazarine intermediate produced from 1:5 or 1:8-dinitronaphthalene, with halogenating agents, e. g. by brominating 5-amino-8-hydroxy-1,4-naphthoquinone-1-imide.

The condensation of these starting materials with ammonia, amines, polyvalent alcohols, phenols or thiophenols is advantageously carried out at an elevated temperature in the presence of a solvent, which may, in fact, be an excess of the substance to be condensed with the halogenated naphthoquinone imides, and also in the presence of condensation accelerators, such as alkaline metal hydroxides, carbonates, bicarbonates or acetates or boric acid, copper or copper salts and the like. When working in this way one or more halogen atoms of the naphthoquinone imides will be replaced by the radicals of the compounds used for the condensation. When using volatile amines, the condensation should be carried out in closed vessels and under pressure. The new condensation products thus obtained dissolve in organic solvents with a red to dark blue color and in concentrated sulfuric acid with a yellow to blue color and can be converted, by treatment with reducing agents, into the corresponding leuco- or hydro compounds which, on exposure to the atmosphere, will again be subjected to oxidation. The said new condensation products are suitable dyestuffs or starting materials for the preparation of dyestuffs.

The formation of the new compounds according to the present invention is illustrated by the following:

When 3,7 - dibromo-5-amino-8-hydroxy-(1,4)-naphthoquinone-imine-(1), corresponding to the formula

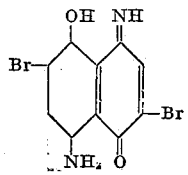

is condensed with, for instance, one molecule of aniline, the resultant final product corresponds to the formula

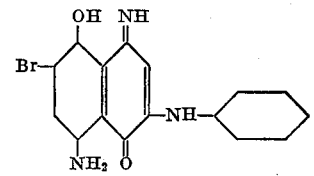

If this condensation is carried out at a temperature of about 40–60° C., then a compound will be obtained which is soluble in ethanol with a blue-violet coloration and in conc. sulfuric acid with a reddish-violet coloration. The analysis of this product has shown that it contains about 10.5% of nitrogen and 23.46% of bromine, whereas the theoretical content would be of about 11.8% of nitrogen and about 22.6% of bromine respectively. But if the condensation is carried out in presence of a great excess of aniline and at a temperature of for example 120° C. and in presence of copper powder, a product will be obtained which is practically free from bromine, which dissolves in ethanol with a violet coloration and possesses quite different tinctorial properties. This compound corresponds to the formula

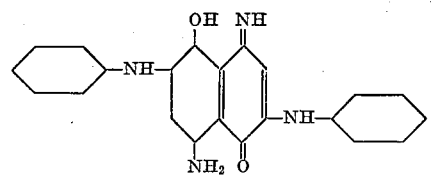

The present invention will now be illustrated by way of the following example, without being limited thereto. The parts are by weight, unless otherwise stated.

Example 1

9 parts of the brominated naphthoquinone imide obtained according to Example 2 of U. S. patent application Ser. No. 729,401, i. e. 3,7-dibromo-5-amino-8 - hydroxy - 1,4 - naphthoquinone-1-imide, are suspended in 100 parts of ethanol, treated with 5 parts by volume of 25% aqueous ammonia, 2 parts of sodium acetate and 0.1 part of copper powder and then heated under pressure for 16 hours at 90° C. After having distilled off the alcohol, the residue is washed with water and dried. A dark powder is obtained which dissolves in ethanol with a blue-violet color and in sulfuric acid with a reddish-brown color, whereas the starting material dissolves in ethanol with a blue color and in sulfuric acid with an olive-brown color.

If, instead of ammonia, a corresponding quantity of dimethylamine is used, a compound will be obtained which is soluble in ethanol with a blue color and in sulfuric acid with a yellow-brown color.

Example 2

10 parts of the brominated naphthoquinone imide used in Example 1 are heated for 24 hours at 50–60° C. with 100 parts of aniline and 0.5 part of boric acid. The product is then poured into an excess of 10% hydrochloric acid and the precipitate filtered off, washed till neutral and dried. There is obtained a resinous, friable mass which can readily be powdered and is soluble in alcohol with a blue-violet color and in sulfuric acid with a reddish-violet color.

If the condensation of the naphthoquinone imide with aniline is carried out in ethanol, an identical product is obtained. This compound is soluble in sodium sulfide with formation of a leuco compound and dyes vegetable fibres from such a solution in grey-blue shades.

If p-toluidine or o-anisidine or aminohydroquinone dimethyl ether or mono-ethylaniline is used, instead of aniline, condensation products are obtained which dissolve in alcohol with a reddish-blue colour and in sulfuric acid with brown to olive shades.

Example 3

17.3 parts of the brominated naphthoquinone imide used in Example 1 are suspended in 200 parts by volume of ethanol and treated with 10 parts of benzidine, 0.5 part of boric acid and 5 parts sodium acetate and heated for 20 hours to boiling under reflux condenser. After having distilled off the alcohol, the product is poured into water and rendered acid to Congo by the addition of hydrochloric acid, then the mixture is filtered and washed till neutral. A dark powder is thus obtained which is soluble in ethanol as well as in sulfuric acid with a blue color and dyes vegetable fibres from a sodium sulfide bath in grey-blue shades.

Example 4

17.3 parts of the brominated naphthoquinone imide used in Example 1 are suspended in 200 parts by volume of ethanol, then treated with 23.8 parts of phenol, 0.5 part of boric acid and 5 parts of sodium acetate and heated to boiling under a reflux condenser for 18 hours. After this period the alcohol is distilled off and the condensation product added to water, whereupon sodium hydroxide is added until the mixture has become alkaline to phenolphthaleine, and finally the product is filtered off and thoroughly washed. A dark powder is obtained which dissolves in ethanol with a corn-flower blue color and in sulfuric acid with a yellow-olive color and which dyes vegetable fibres from a sodium sulfide bath in deep navy-blue shades.

If the 23.8 parts of phenol are replaced by 27 parts of p-thiocresol, then a condensation product is obtained which is sparingly soluble in alcohol with a blue color and in sulfuric acid with a bluish-red color and which dyes vegetable fibres from a sodium sulfide bath in bluish-grey shades.

Example 5

5 parts of the chlorinated naphthoquinone imide obtained according to Example 4 of U. S. patent application Ser. No. 729,401, i. e. 3,7-dichloro-5-amino-8 - hydroxy - 1,4 - naphthoquinone-1-imide, are heated to boiling under a reflux condenser for 16 hours with 20 parts of aniline, 200 parts by volume of ethanol and 0.5 part of boric acid. After having distilled off the ethanol, the residue is poured into water, acidified with hydrochloric acid, filtered and washed till neutral. A dark powder is obtained which dissolves in ethanol with a grey-blue color and in sulfuric acid with a violet color.

Example 6

10 parts of the brominated naphthoquinone imide used in Example 1 are suspended in 200 parts by volume of ethanol and treated with 20 parts of monoethanolamine and 0.5 part of boric acid. The product is heated to boiling under reflux for 20 hours, the excess of alcohol being then distilled off and the residue washed with dilute hydrochloric acid and then washed with water. A dark substance is obtained which dissolves in ethanol with a blue-violet color and in sulfuric acid with an orange-red color.

If the monoethanolamine is replaced by hexahydroaniline, a condensation product is obtained which dissolves in alcohol with a bluish-red color and in sulfuric acid with an orange-brown color.

The condensation product with 2-amino-1-butanol is soluble in ethanol with a red-violet color and in sulfuric acid with a red-orange color; the condensation product with 2-amino-2-methyl-1-propanol dissolves in ethanol with a blue color and in sulfuric acid with a red-brown color.

If the bromo derivative is condensed with aromatic tetrahydro-β-naphthylamine, a compound is obtained which is soluble in ethanol with a blue-violet and in sulfuric acid with a blue color.

Example 7

5 parts of the brominated naphthoquinone imide obtained according to Example 6 of U. S. patent application Ser. No. 729,401, i. e. 3,6-dibromo-8-amino-5 - hydroxy - 1,4 - naphthoquinone-1-imide, are suspended in 100 parts by volume of ethanol and after the addition of 10 parts of aniline and 0.1 part of copper powder, heated to boiling under a reflux condenser for 24 hours. The ethanol is distilled off, the residue first washed with dilute hydrochloric acid and then with water and dried. A product is obtained which dissolves in ethanol with a red-brown color and in sulfuric acid with a red-violet color.

Example 8

9 parts of the brominated naphthoquinone imide used in Example 1 are suspended in 100 parts of α-chloro-naphthalene and heated with 4 parts of o-anisidine in the presence of 0.4 part of copper powder for 17 hours at 180° C. The charge is then allowed to cool down, whereupon α-chloronaphthalene is blown off with steam, the reaction product is washed first with diluted hydrochloric acid and subsequently with water and dried.

The new compound dyes, when applied by the method used for sulfur dyestuffs, cellulosic fibres into deep brown shades.

Example 9

18 parts of the starting product used in Example 1 are suspended in 100 parts of aniline and heated, after addition of 10 parts of anhydrous sodium acetate and 0.1 part of copper powder, for 30 hours at a temperature of 60–70° C. After this time a test taken out and diluted with ethanol shows the absorption bands lying at about λ620, 583 and 541. The charge is diluted with water, acidulated with hydrochloric acid and the condensation product filtered, washed and dried.

*Example 10*

5 parts of the brominated naphthoquinone imide as obtained according to Example 11 of the U. S. patent application Ser. No. 729,401, i. e. 2,3,7-tribromo-5-amino-8-hydroxy-1,4-naphthoquinone-1-imide, are suspended in 100 parts of isopropyl alcohol. 5 parts of an aqueous 25% ammonia solution and 2 parts of sodium acetate are added thereto and heated in a closed vessel for 12 hours at 90° C. After this time the charge is isolated, a small excess of ammonia and the isopropyl alcohol are removed by evaporation, the residue washed with water and dried. It is soluble in ethanol with a violet coloration.

*Example 11*

9 parts of the starting product used in Example 1 are suspended in 200 parts of ethanol and heated, after addition of 4.5 parts of p-aminoacetanilide and of 0.1 part of copper powder, for 24 hours at the boil. After isolation the product is dried. It is soluble in ethanol with a blue coloration.

*Example 12*

9 parts of the starting product used in Example 1 are suspended in 100 parts of isopropyl alcohol and, after addition of 5 parts of aminohydroquinone dimethyl ether and of 1 part of zinc powder, the mixture is heated in a closed vessel for 14 hours at 130° C. The condensation product is isolated in the usual manner. It is soluble in ethanol with a reddish-blue coloration.

*Example 13*

9 parts of the starting product used in Example 1, 10 parts of an aqueous 21% dimethylamine solution, 50 parts of isopropyl alcohol, 50 parts of water, 4.5 parts of hydrosulfite dissolved in 20 parts of water and 0.1 part of copper powder are introduced into a closed vessel and heated for 20 hours at 45–50° C. The charge is then diluted with water, the dimethylamine is blown off with a stream of air and isopropyl alcohol is distilled off. The charge is then heated up to 90° C., 5 parts of caustic soda lye are added thereto, the solution is filtered and the dyestuff is salted out by means of addition of sodium chloride. The new compound is soluble in water and dyes wool into brown-violet shades.

*Example 14*

10 parts of the brominated naphthoquinone imide obtained according to Example 6 of the U. S. patent application Ser. No. 729,401, i. e. the starting product used in Example 7, are suspended in 100 parts of isopropyl alcohol and, after addition of 10 parts of aniline and 0.1 part of copper powder, are heated to the boil for 20 hours. The charge is then diluted with 500 parts of water, acidulated with 13 parts of hydrochloric acid and filtered. In dry state the product is soluble in ethanol with a reddish-blue coloration.

*Example 15*

9 parts of the starting product used in Example 1 are suspended in 100 parts of phenol and, after addition of 8 parts of o-anisidine and of 0.5 part of copper powder, are heated for 30 hours at 90° C. The charge is then poured into water, 145 parts of caustic soda lye 33° Bé. are added thereto, and the whole is filtered. The precipitate is introduced into 1000 parts of water and 10 parts of hydrochloric acid 25%, the whole mixture being then stirred at 50° C. for 2 hours, filtered, washed and dried. The compound thus obtained is soluble in ethanol with a deep blue coloration.

*Example 16*

10 parts of chlorinated naphthoquinone imide prepared from 1:8-dinitronaphthalene are heated in 100 parts of aniline in the presence of 0.5 part of copper powder and 5 parts of anhydrous sodium acetate for 20 hours at 90° C. After this time the charge is diluted with water, acidulated with hydrochloric acid, filtered and washed. After drying the product thus obtained is soluble in ethanol with a red-brown coloration.

*Example 17*

9 parts of the starting product used in Example 1 are suspended in 100 parts of monoethylglycol ether, then 2.2 parts of sodium hydroxide are added thereto and the charge heated for 16 hours at 110–120° C. After this time the charge is poured into water, acidulated with hydrochloric acid and filtered. The compound thus obtained is soluble in ethanol with a red-violet coloration.

*Example 18*

9 parts of the starting product used in Example 1 are suspended in a mixture of 50 parts of glycerol and 50 parts of ethanol and, after addition of 2.2 parts of sodium hydroxide, are heated to 80° C. for 48 hours. The new compound is isolated in the usual manner and is soluble in ethanol with a red-violet coloration.

*Example 19*

9 parts of the starting product of Example 1 are heated in 100 parts of isopropyl alcohol with 3.5 parts of cresidine and 0.5 part of boric acid for 16 hours at 80–82° C. The condensation product is isolated in the usual manner. It is soluble in ethanol with a dull blue coloration.

*Example 20*

9 parts of the starting product used in Example 1 are suspended in 15 parts of 85% acetic acid; then 3 parts of boric acid and 50 parts of aniline are added thereto and the charge heated for 24 hours at 50–60° C. After this time the charge is poured into 500 parts of water, 50 parts of 25% hydrochloric acid are added thereto and the mixture is well stirred, filtered and washed. The dry product is soluble in ethanol with a blue coloration.

If 3 parts of zinc powder are added to the same charge and if the aniline is added to the reduced compound, while otherwise heating the mixture as above described, then a product will be obtained which is also soluble in ethanol, but giving a dull blue coloration.

*Example 21*

18 parts of the starting product used in Example 1 are suspended in 100 parts of aniline and, after addition of 10 parts of anhydrous sodium acetate and of 0.1 part of copper powder, the mixture is heated for 36 hours at 100–130° C. At this time a test taken out shows two absorption bands at about λ583 and 539. The condensation product is then isolated in the manner described above and dried. It is soluble in ethanol with a blue-violet coloration.

What I claim is:

1. A process for the manufacture of new condensation products of the naphthoquinone imine series, comprising the step of condensing a halogenated naphthoquinone imine with a compound selected from the class consisting of ammonia and primary and secondary amines.

2. A process for the manufacture of new condensation products of the naphthoquinone imine series, comprising the step of condensing a halogenated naphthoquinone imine with a compound selected from the class consisting of ammonia and primary and secondary amines, in the presence of a solvent and an acid binding agent.

3. A process for the manufacture of new condensation products of the naphthoquinone imine series, comprising the step of condensing a halogenated naphthoquinone imine with a compound selected from the class consisting of ammonia and primary and secondary amines, in the presence of a solvent and a condensing agent.

4. A process for the manufacture of new condensation products of the naphthoquinone imine series, comprising the step of condensing a halogenated naphthoquinone imine with a compound selected from the class consisting of ammonia and primary and secondary amines, in the presence of a solvent and copper.

5. A process for the manufacture of new condensation products of the naphthoquinone imine series, comprising the step of condensing a halogenated naphthoquinone imine with an excess of a compound selected from the class consisting of ammonia and primary and secondary amines, which excess acts as solvent.

6. A process for the manufacture of new condensation products of the naphthoquinone imine series, comprising the step of condensing a halogenated naphthoquinone imine with an aromatic amine in the presence of an excess of the aromatic amine, an acid binding agent and copper as catalyst at a temperature of 30-200° C.

7. A process for the manufacture of new condensation products of the naphthoquinone imine series, comprising the step of condensing a halogenated naphthoquinone imine with an aromatic amine in the presence of an alcohol, an acid binding agent and copper as catalyst at a temperature of 30-90° C.

8. A process for the manufacture of new condensation products of the naphthoquinone imine series, comprising the step of condensing a halogenated naphthoquinone imine with a primary aromatic amine in the presence of an excess of the aromatic amine, an acid binding agent and copper as catalyst at a temperature of 30-200° C.

9. A process for the manufacture of new condensation products of the naphthoquinone imine series, comprising the step of condensing a halogenated naphthoquinone imine with a primary aromatic amine in presence of an alcohol, and acid binding agent and copper as catalyst at a temperature of 30-90° C.

10. A process for the manufacture of new condensation products of the naphthoquinone imine series, comprising the step of condensing a dihalogenonaphthoquinone imine with a primary aromatic amine in the presence of an excess of the same amine, an acid binding agent and copper as catalyst at a temperature of 30-200° C.

11. A process for the manufacture of new condensation products of the naphthoquinone imine series, comprising the step of condensing a dibromodinaphthoquinone imine of aniline in the presence of sodium bicarbonate and copper powder at a temperature of 30-80° C.

12. A process for the manufacture of new condensation products of the naphthoquinone imine series, comprising the step of condensing a dibromodinaphthoquinone imine of o-anisidine in the presence of sodium bicarbonate and copper powder at a temperature of 30-80° C.

13. A process for the manufacture of new condensation products of the napthoquinone imine series, comprising the step of condensing a dibromodinaphthoquinone imine with aminohydroquinone dimethylether in the presence of isopropyl alcohol, of sodium bicarbonate and copper powder at a temperature of 30-80° C.

14. A condensation product of the naphthoquinone imine series which corresponds to the formula:

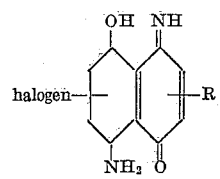

wherein R represents a radical selected from the group consisting of —$NH_2$, —$N(CH_3)_2$, —N-lower-hydroxy-alkyl, —NH-cyclohexyl, —NH-phenyl and —NH-lower alkoxyphenyl.

15. A condensation product of the naphthoquinone imine series which corresponds to the formula

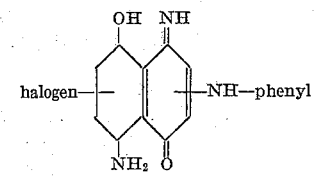

16. A condensaion product of the formula

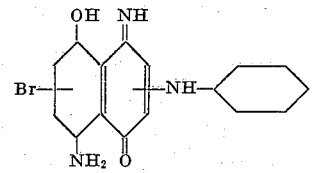

17. A condensation product of the formula

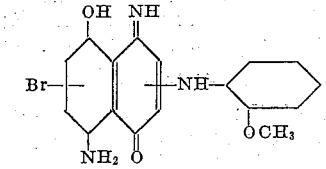

18. A condensation product of the formula

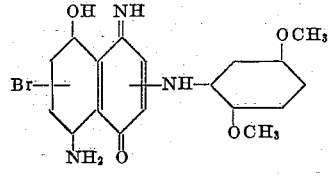

VALENTIN KARTASCHOFF.

No references cited.